United States Patent [19]

Vehmas et al.

[11] Patent Number: 5,306,324
[45] Date of Patent: Apr. 26, 1994

[54] METHOD AND APPARATUS FOR BENDING AND TEMPERING A GLASS SHEET

[75] Inventors: Jukka H. Vehmas; Juha Paavola, both of Tampere, Finland

[73] Assignee: Tamglass Engineering Oy, Tampere, Finland

[21] Appl. No.: 904,481

[22] Filed: Jun. 25, 1992

[30] Foreign Application Priority Data

Apr. 30, 1992 [FI] Finland .................................. 921964

[51] Int. Cl.$^5$ .......................................... C03B 23/025
[52] U.S. Cl. ........................................... 65/104; 65/29; 65/107; 65/160; 65/268; 65/273; 65/274
[58] Field of Search .................... 65/29, 104, 107, 160, 65/162, 163, 268, 273, 274

[56] References Cited

U.S. PATENT DOCUMENTS

| | | | |
|---|---|---|---|
| 3,249,415 | 5/1966 | McMaster et al. | 65/160 |
| 4,497,645 | 2/1985 | Peltonen | 65/107 |
| 4,755,204 | 7/1988 | Boardman et al. | 65/107 |
| 5,009,691 | 4/1991 | Aratani | 65/107 |

*Primary Examiner*—Joye L. Woodard
*Attorney, Agent, or Firm*—Burns, Doane, Swecker & Mathis

[57] ABSTRACT

The invention relates to a method and apparatus for bending and tempering a glass sheet. A glass sheet is supported by one and the same ring mould (3) throughout all its working operations. Following the preheating of a glass sheet from a temperature of about 500° C., its heating to a final bending and tempering temperature is effected at a high output and rate of speed. For example, on 4 mm thick glass, this final heating is performed within a period of time of 15-25 s. Therefore, the temperature of bending station is 800°-1000° C. Since rapidly heating glass bends quickly, the bending flexure or temperature of glass is monitored and the glass is advanced to tempering as soon as a predetermined bending flexure or temperature is reached.

14 Claims, 2 Drawing Sheets

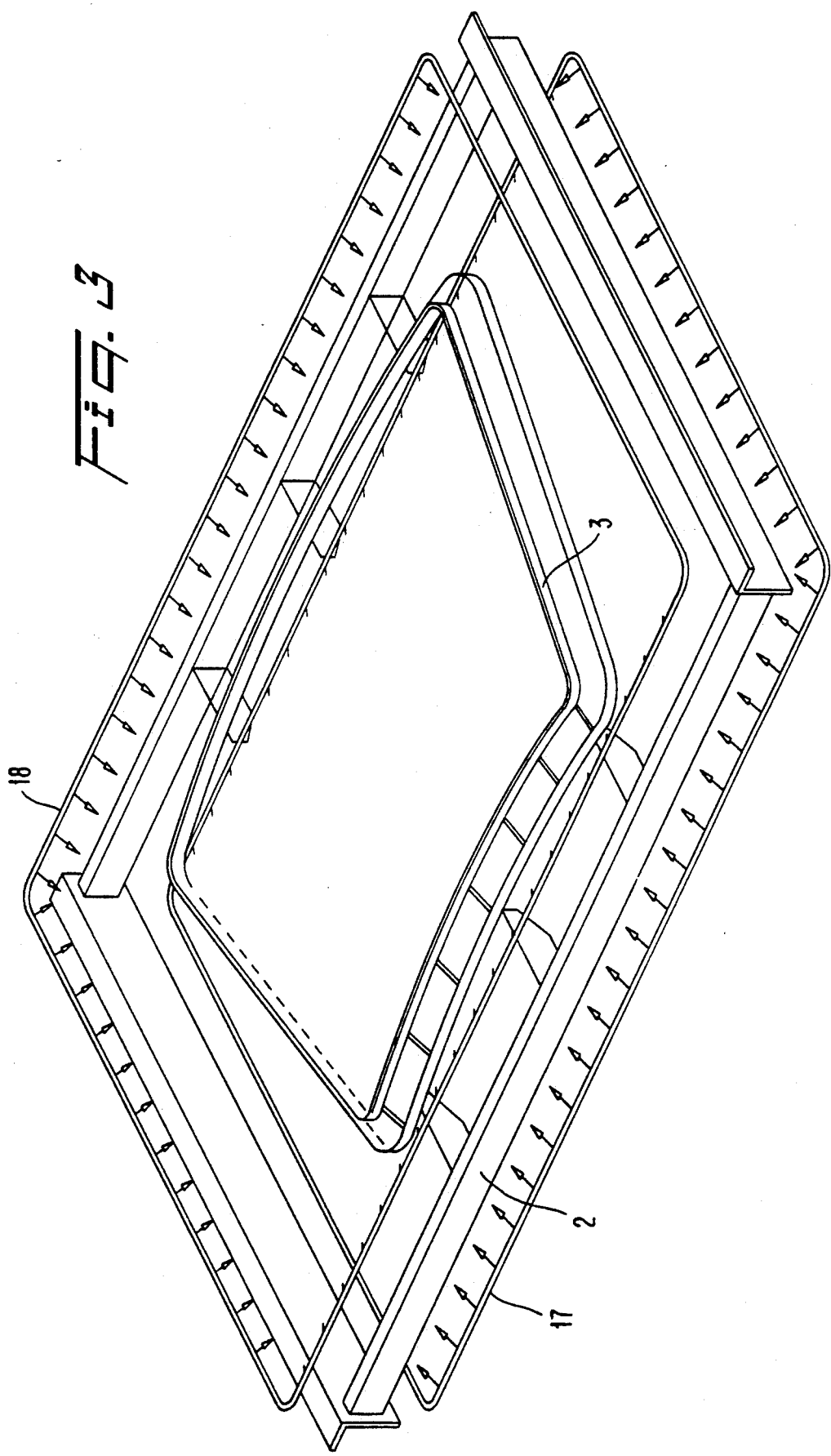

METHOD AND APPARATUS FOR BENDING AND TEMPERING A GLASS SHEET

BACKGROUND AND SUMMARY OF THE INVENTION

The present invention relates to a method for bending and tempering a glass sheet, in which method a glass sheet supported by a ring mould is heated to a softening temperature, the glass sheet is allowed to bend gravitationally and the bent glass sheet is advanced to tempering.

The invention relates also to an apparatus for bending and tempering a glass sheet, said apparatus comprising a ring mould for supporting a glass sheet at various stages of handling, a preheating station, and a quenching station.

The invention is particularly well suited for bending relatively simple glass shapes which can be bent gravitationally by using a ring mould. Most of the automotive side windows and backlights are such simple shapes or forms that can be bent by using a method and apparatus of the invention. For essentially the same purpose there is a prior known method, wherein a piece of homothermal glass is dropped onto a ring mould and the piece of glass assumes its proper form by virtue of inertial force and the shape of a ring mould. This prior known method offers the advantages of high capacity and reliability but its drawbacks include a high price, a rather long form replacement time (4-5 h), marks caused by dropping on the glass border areas, and the high price of tools required by individual pieces of glass.

On the other hand, there are known single furnaces operating on the ring mould principle, wherein the glass is only heated from above and the glass bends to its shape or form whose bending depth is determined by adjusting the heating time. An advantage offered by single furnace is a simple construction and a low price but there are also drawbacks, including a low capacity, a relatively high minimum thickness (typically 5 mm, sometimes 4 mm), simple bending shapes and fairly good bending accuracy (as the bending depth is only controlled by means of heating time).

An object of the invention is to provide an improved method and apparatus, capable of offering the following benefits:

economical price in view of capacity;

a reachable glass thickness is substantially below 4 mm, typically a 3,2 mm minimum thickness or therebelow;

compact size of the apparatus;

low tooling costs (e.g., only four ring moulds are required for a glass pattern);

a short glass-pattern; replacement time (typically less than 0,5 h).

This object of the invention is achieved on the basis of the characterizing features set forth in the annexed claims.

BRIEF DESCRIPTION OF THE DRAWING FIGURES

One embodiment of the invention will now be described in more detail with reference made to the accompanying drawing, in which FIG. 1 is a schematic view of a lengthwise vertical section through a furnace of the invention FIG. 2 is a schematic view of lengthwise horizontal section through the same furnace; and, FIG. 3 is a perspective view of a detail in a bending station 8.

DETAILED DESCRIPTION OF THE PREFERRED EMBODIMENT

Figure 1:
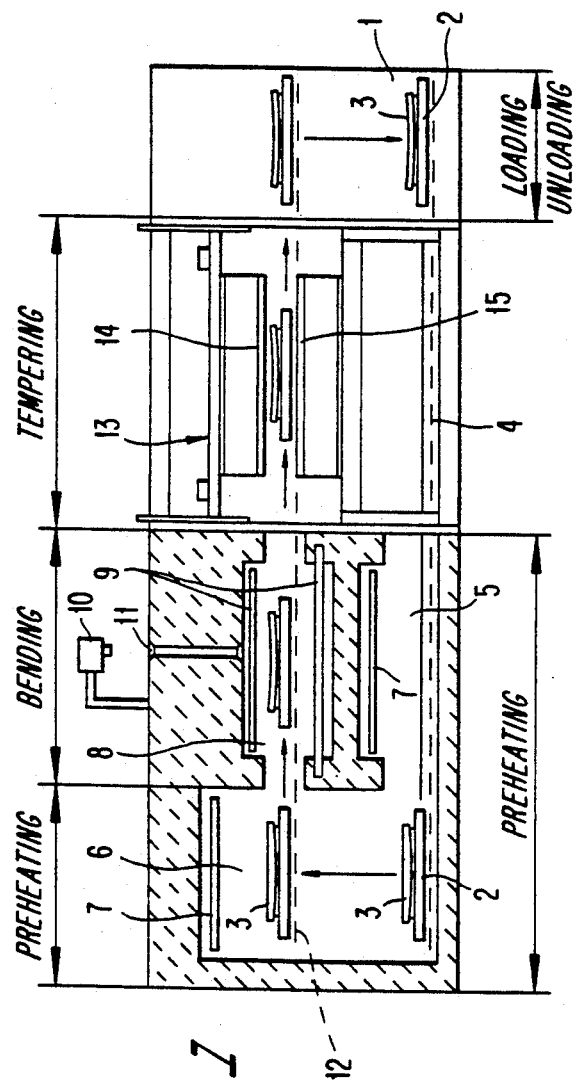
Figure 2:
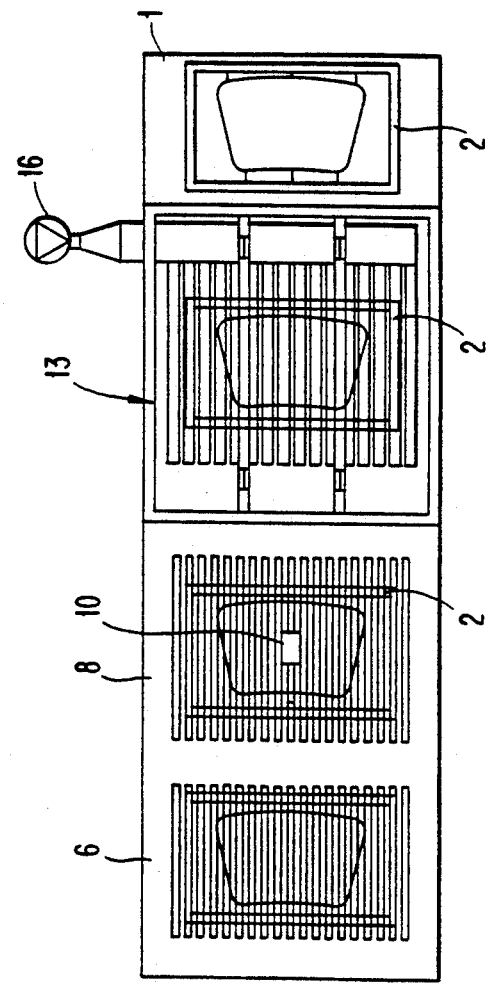

In a loading station 1 a glass sheet to be bent is placed on top of a ring mould 3. The ring mould 3 is advanced upon a carriage 2 along a lower horizontal track 4 into a preheating station 5, fitted with resistances 7 for heating a glass sheet from above by the application of radiation heat. Thereafter, said carriage 2 along with its mould 3 and glass sheet is shifted to a location below a preheating station 6 and is lifted by means of a hoist into said preheating station 6, wherein the heating is continued by means of resistances 7. As known in the art, the preheating can be effected at a relatively rapid rate since heat transfers effectively to cold glass. In preheating, a glass sheet typically reaches a temperature of about 500° C. Naturally, the final temperature of preheating can fluctuate considerably one way or the other. The preheated glass along with its ring mould 3 is advanced into a bending station 8, which at the same time serves as an effective heating chamber having a temperature of appr. 900° C. The temperature of heating and bending chamber 8 can typically fluctuate within the range 800°-1000° C. Said chamber 8 is provided with powerful resistances 9 for heating a glass sheet so quickly that a piece of 4 mm glass heats from 500° C. within about 15-20 seconds up to a tempering temperature of 600°-630° C., typically 615°-620° C. During this rapid heating the glass is simultaneously allowed to bend. Thus, e.g. with 4 mm glass, the temperature increase rate is preferably about 6°-8° C./s, i.e. generally about 24°-32° C./mm/s. In order to achieve the object of the invention, the temperature increase rate should be at least appr. 15° C./mm/s.

The glass temperature is monitored by means of a pyrometer and/or the bending flexure by means of an optical apomecometer device 10. Therefore, the heat insulation of the furnace ceiling is provided with an observation window 11. When pyrometer and/or flexure measuring device 10 detects that a predetermined glass temperature and/or bending flexure has been reached, the glass is carried as quickly as possible to tempering. The passage from bending station 8 to a tempering station 13 is effected on the same ring mould 3 along a track 12. In tempering station 13, both sides of a glass sheet are subjected to the action of cooling air jets. This can be accomplished by using upper and lower manifolds 14 and 15, whose ends can be either on a straight line or can be set according to an anticipated, compromised bending form. From tempering station 13 the glass and its mould 3 are transferred into an unloading station, wherein the tempered glass is removed from ring mould 3. This is followed by placing the next piece of glass on top of the ring mould and the glass, together with its ring mould, is advanced into the preheating station.

Ring mould 3 is supported on carriage 2 from outside and it is coated with a fibrous coating suitable for glass bending and tempering.

The movements of carriage 2 along tracks 4 and 12 are produced e.g. by means of a system described in U.S. Pat. publication 4 497 645 by using carriages mounted on wheels rotatable from outside the furnace.

The bending station 8 serving as a power heating chamber is the heart of an apparatus of the invention. A novel feature therein is high-speed heating facilitated by a high temperature, appr. 900° C. The bending of glass can be effected without the application of heat by means of a ring mould to a desired shape. This applies to simple glass shapes but, as the shape reaches a higher degree of complexity, the glass thickness decreases and the glass size increases, there will be more and more difficulties in producing a desired shape or form. Close control of the glass temperature and/or degree of bending and a possibility of moving the glass quickly to tempering make sure, however, that a method and apparatus of the invention are capable of readily and controllably bending flexural forms that are conventional in automotive backlights and side windows.

A method of the invention facilitates particularly the bending and tempering of thin (3–4 mm) pieces of glass as bending does not begin until the tempering temperature is just exceeded; as soon as a desired shape is obtained, the glass can be advanced directly to tempering. In the cases of lower-temperature furnaces this is not possible, since the central glass area has already had enough time to sag or bend further than a desired shape by the time the tempering temperature is reached.

When using a ring mould for supporting a piece of glass throughout the heating operation, the result will be that the border or edge areas of glass remain colder than the rest of the glass. The reason for this is that, by virtue of its mass and thermal capacity, a ring mould shall remain colder than glass and, thus, it receives heat from glass. If a piece of glass is to be tempered, the entire glass must be thoroughly heated to above the tempering temperature and, thus, the central glass areas will become unnecessarily hot. This, in turn, leads to uncontrollable over-bending of the central glass areas.

If the effect of ring mould 3 on a slower heating rate in the border area of a glass sheet cannot be eliminated or compensated by a further heating of the border area, the glass will be heated over its central area to 10°–20° C. unnecessarily high temperature in order to temper the border area as well (or just to keep the glass intact). Considering the common rule that the bending rate of glass doubles as the glass temperature increases by 8° C., it is possible to understand the problem caused by the cooling effect of a ring mould.

In order to eliminate this problem, according to the invention the heating of a glass sheet in bending station 8 be intensified by using forced convection to direct heat to at least the glass sheet border areas supported by ring mould 3. This is illustrated in FIG. 3.

Thus, the glass border or edge area is heated more to equalize the cooling effect of a ring mould, but no more than that. The objective is to obtain a completely homothermal piece of glass.

The technical solution is carried out by using compressed air jets which are blasted from tubes 17 and/or 18 fitted adjacent to the border area. From the lower tube 17 the air jets are blown vertically upwards (possibly at a 15° angle) in a manner that the air jet does not hit the glass but the border area and ring mould 3 are heated by a vortex formed by the air jets. Since the demand for supplementary heat is slight, just one of the tubes, e.g. lower tube 17, is probably needed. In practice, the manifold is not a continuous loop but divided into a plurality of individually controlled zones.

Tests have shown that mere radiation heating is not always capable of sufficiently heating the top surface of glass but, instead, the bottom side heats more even though the bottom side would not be actually heated at all. This can be compensated by utilizing convection blasting if necessary over the entire surface area of a glass sheet in view of compensating for the heating of either top or bottom surface.

As already pointed out, the bent piece of glass heated to a tempering temperature is advanced as quickly as possible to tempering. This is important since, once outside a furnace, the 4 mm glass cools prior to tempering at a rate of appr. 5° C./s. Every "wasted" second results in unnecessary over-heating of glass by 5° C. Therefore, the quenching blast should already be switched on and the nozzles should be in a proper position when the glass is brought to tempering. If tempering of all glass shapes cannot be performed by a single manifold or nozzle system, said manifolds 14, 15 can be made replaceable. In the simplest of embodiments, said manifolds or nozzle systems 14, 15 comprise folded and perforated plates. For example, four different manifolds (perforated plates) folded to various shapes will be sufficient to cover the entire area. Naturally, it would also be possible to employ an adjustably shaped manifold (adjustment can be manual). As described above, an apparatus of the invention is very simple in its technical construction and thus economical in its costs. Nevertheless, in view of its price and size, said apparatus yields a very high production capacity (60–120 loadings/h).

We claim:

1. A method for bending and tempering a glass sheet, comprising the steps of:
   supporting a glass sheet on a ring mould;
   preheating the glass sheet in a lower station;
   lifting the glass sheet on the ring mould to an upper preheating station for additional preheating;
   carrying the glass sheet on the ring mould to a heating and bending station;
   heating the glass sheet to a softening temperature and allowing the glass sheet to bend gravitationally;
   advancing the bent glass sheet to a tempering station; and,
   tempering the glass sheet;
   wherein, heating of the glass sheet above the glass sheet temperature of 500° C. to a tempering temperature is effected at a heating rate such that a 4 mm glass sheet heats from the temperature of 500° C. to a tempering temperature of 600°–630° C. in less than 28 seconds, whereby the temperature increase rate of a glass sheet at least at the glass surface is in average at least approximately 15° C./mm/s.

2. A method as set forth in claim 1, wherein said temperature increase rate is 24–32° C./mm/s.

3. The method as set forth in claim 1, wherein at least one of the bending flexure and temperature of the glass sheet is measured and, upon reaching a predetermined bending flexure or temperature, the glass sheet is advanced to the tempering station supported by the ring mould.

4. A method as set forth in claim 1, wherein in the heating station the application of heat to the glass sheet is intensified by forced convection to equalize the temperature of the glass sheet to obtain a homothermal sheet.

5. A method as set forth in claim 4, wherein forced convection is applied at least to the border areas of a glass sheet, which are supported by ring the mould (3).

6. A method as set forth in claim 5, wherein the forced convection is applied to border areas of the glass sheet by blasting jets in a manner that the blasting jets are directed past the edge of the glass sheet to create vortices at the ring mould adjacent to the edge of a glass sheet.

7. A method as set forth in claim 1, wherein said temperature increase rate is 6°-8° C/s on 4 mm glass.

8. A method for bending and tempering a glass sheet, comprising:
 loading a glass sheet at a loading station on a ring mold to support the glass sheet;
 moving the ring mold and glass sheet on a lower level to a lower preheating station for a first preheating step;
 raising the ring mold and glass sheet to an upper preheating station on an upper level for a second preheating step;
 moving the ring m old and glass sheet on the upper level to a heating and bending station located above the lower preheating station;
 heating the glass sheet for gravitational bending;
 allowing the glass sheet to bend;
 moving the ring mold glass sheet to a tempering station after bending;
 tempering the glass sheet;
 moving the ring mold and sheet to the loading station; and,
 unloading the bent and tempered glass sheet.

9. An apparatus for bending and tempering a glass sheet, comprising:
 a ring mould for supporting a glass sheet in various working operations;
 two preheating stations;
 a bending station, the two preheating stations being located on different vertical levels, a first preheating station being below the bending station and a second preheating station being adjacent to the bending station;
 a tempering station;
 means for maintaining the temperature of the bending station in the range of 800° to 1000° C.;
 means for measuring at least one of the bending flexure and the temperature of a glass sheet; and,
 means responsive to the flexure and temperature measuring means for advancing the ring mould and the glass sheet supported thereby when the glass sheet reaches a temperature of 600° to 630° C. from the heating and bending station into the tempering station.

10. An apparatus for bending and tempering a glass sheet, comprising:
 a loading station for loading a glass sheet on a ring mold and unloading a finished glass sheet from a ring mold located on a lower level;
 a lower preheating station adjacent to the loading station on the lower level;
 an upper preheating station located on an upper level;
 a heating and bending station located on the upper level adjacent to the upper preheating station and above the lower preheating station;
 a tempering station adjacent to the heating and bending station;
 means for transferring a ring mold from the loading station to the lower preheating station to the upper preheating station to the heating and bending station to the tempering station and back to the loading station;

11. The apparatus as claimed in claim 10, further including means for detecting the bending flexure of the glass sheet in the heating and bending station and means responsive to the flexure detecting means for advancing the glass sheet from the heating and bending station after a predetermined bending flexure is detected.

12. The apparatus as claimed in claim 10, further including means for measuring the temperature of the glass sheet in the heating and bending station and means responsive to the temperature measuring means for advancing the glass sheet from the heating and bending station after a predetermined glass sheet temperature is detected.

13. The apparatus as claimed in claim 10, wherein the heating station further includes air jets to direct heated air in the station toward the ring mould and edge of the glass sheet to intensify heating of the glass sheet at the ring mould.

14. The apparatus as claim 10, wherein the heating and bending station further includes forced convection means to equalize the temperature of a top and bottom of the glass sheet.

* * * * *